United States Patent
Albrecht

(10) Patent No.: US 9,067,348 B2
(45) Date of Patent: Jun. 30, 2015

(54) METHOD FOR MANUFACTURING BLOW MOLDS

(71) Applicant: KRONES AG, Neutraubling (DE)

(72) Inventor: Thomas Albrecht, Beilngries (DE)

(73) Assignee: KRONES AG, Neutraubling (DE)

( * ) Notice: Subject to any disclaimer, the term of this patent is extended or adjusted under 35 U.S.C. 154(b) by 46 days.

(21) Appl. No.: 14/040,923

(22) Filed: Sep. 30, 2013

(65) Prior Publication Data

US 2014/0106105 A1    Apr. 17, 2014

(30) Foreign Application Priority Data

Oct. 17, 2012   (DE) .................. 10 2012 218 928

(51) Int. Cl.
*B29C 41/08*   (2006.01)
*B29C 49/48*   (2006.01)
*B29C 33/38*   (2006.01)

(52) U.S. Cl.
CPC ........... *B29C 41/08* (2013.01); *Y10T 428/1397* (2015.01); *B29C 49/48* (2013.01); *B29C 49/4823* (2013.01); *B29C 2049/4874* (2013.01); *B29C 2049/4876* (2013.01); *B29C 2049/4897* (2013.01); *B29C 33/3857* (2013.01); *B29C 2033/3864* (2013.01)

(58) Field of Classification Search
None
See application file for complete search history.

(56) References Cited

U.S. PATENT DOCUMENTS

| 2,113,166 | A | * | 4/1938 | Zinser | 156/212 |
| 4,847,026 | A | * | 7/1989 | Jarboe et al. | 264/46.7 |
| 5,817,267 | A | * | 10/1998 | Covino et al. | 264/219 |

FOREIGN PATENT DOCUMENTS

| DE | 2061941 A1 | 6/1971 |
| DE | 2936273 A1 | 3/1981 |
| DE | 3137598 A1 | 6/1983 |
| DE | 3626019 C1 | 11/1987 |
| DE | 19742613 A1 | 4/1999 |
| DE | 10022114 A1 | 11/2001 |
| DE | 10034508 A1 | 1/2002 |
| DE | 10060674 A1 | 6/2002 |
| DE | 60023883 T2 | 8/2006 |
| DE | 102010018590 A1 | 10/2011 |
| DE | 102010003033 A1 | 11/2011 |
| EP | 0117985 B1 | 5/1988 |
| EP | 2405033 A1 | 1/2012 |
| GB | 2057342 A | 4/1981 |
| GB | 2362156 A | 11/2001 |

OTHER PUBLICATIONS

Search report for DE 10 2012 218 928.9, dated Feb. 13, 2013.
Search report for EP 13 17 9555, dated Jan. 31, 2014.

* cited by examiner

*Primary Examiner* — Monica Huson
(74) *Attorney, Agent, or Firm* — Marshall, Gerstein & Borun LLP

(57) ABSTRACT

A method for manufacturing segmented blow molds for plastic containers, where blow mold preforms are manufactured by flame-spraying at least one metal-containing and/or ceramic-containing layer on a negative model of at least one segment of the blow mold to be manufactured, and the at least one layer is then detached from the negative model, thereby providing a particularly simple and repeatable manufacturing of blow molds.

15 Claims, 2 Drawing Sheets

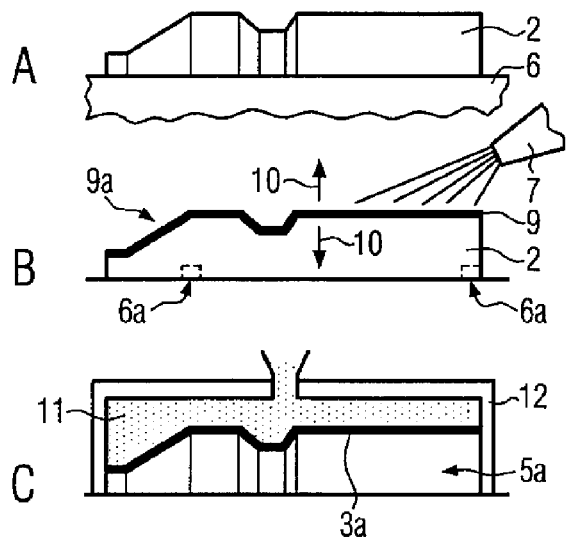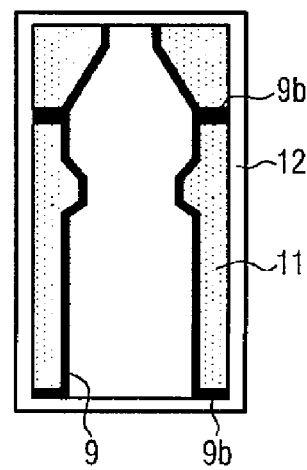
FIG. 1  FIG. 2
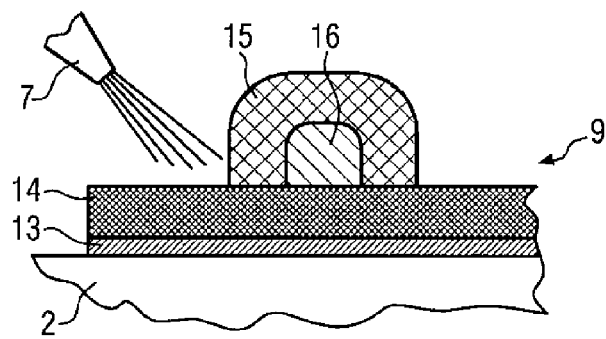
FIG. 3
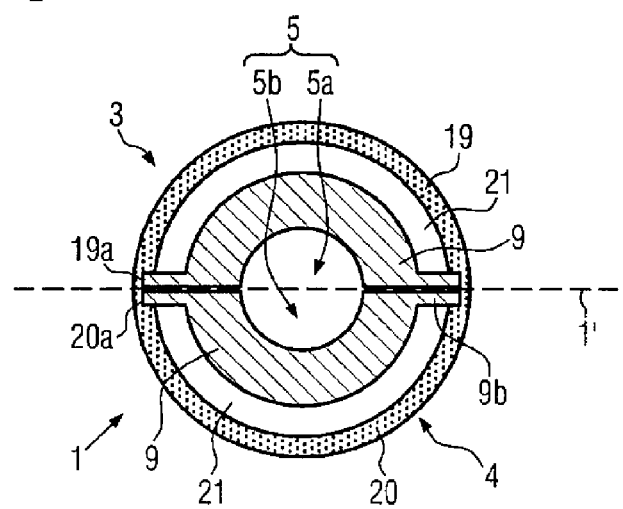
FIG. 4

METHOD FOR MANUFACTURING BLOW MOLDS

CROSS-REFERENCE TO RELATED APPLICATION

The present application claims the benefit of priority of German Application No. 102012218928.9, filed Oct. 17, 2012. The entire text of the priority application is incorporated herein by reference in its entirety.

FIELD OF THE DISCLOSURE

The disclosure relates to a method for manufacturing blow molds for plastic containers, in particular plastic bottles, a blow mold manufactured with the method and a plastic container produced with such a blow mold.

BACKGROUND

Plastic containers, such as plastic bottles or the like, can—as known—be produced in blow molds by stretch-blowing heated preforms. They are, for example, segmented into two halves along the major axis of the container to be blown which can be opened prior to and after stretch-blowing the plastic bottle. The blow mold halves essentially correspond to a negative of the bottle to be produced and are usually manufactured, for example, by milling, eroding and coating the inner blow mold surface, depending on the complexity of the bottle surfaces to be produced. In this, each blow mold half is produced individually, for example, using suitable CAD methods by stringing together the individual processing steps in a comparatively complex manner.

Additional technical problems are caused by functional cavities within the blow mold, for example, in the form of ducts for tempering the blow mold or for receiving sensors or the like. The production of these cavities is relatively complex.

There is therefore a need for methods to simplify the manufacturing of blow molds for plastic containers, in particular for the series production of such blow molds for the use in blow molding machines having a wide variety of blowing stations.

SUMMARY OF THE DISCLOSURE

This object is provided with a method according to the disclosure including a step of manufacturing blow mold preforms by flame-spraying at least a metal-containing and/or a ceramic-containing and/or a plastic-containing layer on a negative model of at least a segment of the blow mold to be produced, and by detaching the at least one layer from the negative model.

In terms of the manufacturing process of the blow mold, the inner wall of the blow mold segment is subsequently considered to be the positive mold where the negative model used for flame-spraying is considered to be the negative mold. The negative model is a body whose shape essentially corresponds to the shape of the container or a container section to be produced. In other words, the negative model corresponds substantially to the shape of the partial cavity of the blow mold respectively to be formed with the negative model. The blow mold is segmented in a known manner along at least one parting plane provided on the blow mold for opening/closing the blow mold. Preferably, exactly one parting plane is provided dividing the blow mold in the longitudinal direction.

Flame-spraying as a collective term comprises various variants of spraying methods known per se, such as wire flame-spraying, powder flame-spraying, high velocity flame-spraying, arc spraying or the like.

Metal-containing and ceramic-containing layers are to be understood as being those in which a portion of at least one metal or one ceramic substance is specifically included to affect material properties, as opposed to metallic or ceramic contaminants, trace elements or the like. Preferably, the metal-containing and/or ceramic-containing layers have a metal content of at least 25% and/or a ceramic content of at least 25%.

Detaching according to the disclosure is understood to be demolding, in which the blow mold preforms, whose structure is substantially formed by at least one sprayed-on layer, are separated from the mold containing the negative model. Excess material, edges or the like can then be removed mechanically if required.

Preferably, the negative model is first coated with a contact layer of the blow mold preform and then with a carrier layer of the blow mold preform. The contact layer has a heat conductivity adapted to a predetermined blowing process and/or lower electrical conductivity and/or higher mechanical resistance to wear and/or higher toughness and/or higher tensile strength and/or better corrosion resistance and/or better antimicrobial properties than the carrier layer. The contact layer essentially forms the inner wall of the blow mold which is effective during blow molding.

The thermal conductivity, for example, is adapted to the blow molding process such that the thermal conductivity of the contact layer is higher than the thermal conductivity of the carrier layer. This allows the blown container to be cooled down very rapidly. The thermal conductivity adapted according to the disclosure of the contact layer can also be lower than the thermal conductivity of the carrier layer. This allows heat to be retained in the blown container, depending on the set-up of the process. For standard applications, relatively high thermal conductivity of the contact layer is desirable to rapidly dissipate heat from the container. Heat conduction can additionally be specifically influenced by the thickness of the contact layer. For example, the heat conduction can, in spite of comparatively low thermal conductivity, be sufficient when having a respectively thin contact layer. Heat transfer through the contact layer can thereby be specifically promoted or inhibited.

For example, a contact layer of or with aluminum oxide is suitable to increase the mechanical resistance to wear and for electrical insulation. For thermal insulation, for example, a contact layer of or with zirconium oxide is suited. Particularly tough and unbreakable contact layers can be produced, for example, from or with aluminum oxide and/or titanium oxide. For the general improvement of tribological properties, contact layers made of or with chromium oxide are suited. For good antimicrobial properties within the meaning of preventing or reducing bacterial growth, contact layers containing silver ions are suited. Contact layers for improving corrosion resistance are preferably used in connection with supporting layers of steel or aluminum.

It is particularly advantageous in the method according to the disclosure, that the contact layer is sprayed onto the negative model, and does not—like in known methods—need to be applied onto the already molded blow mold segment, i.e. the positive mold, because the latter often requires finishing work for the contact layer. Furthermore, the method according to the disclosure can also have a relatively thin contact layer be applied, in particular, one which is thinner than the carrier layer. The costs for the relatively expensive materials for the contact layers can thereby be reduced. Carrier layers made of sufficiently heat-conducting and stable materials can in contrast be produced at low costs. The carrier layer therefore primarily has the duty to mechanically support the contact layer, to ensure sufficient heat conduction in individual areas of the blow molds, and to receive functional elements, such as tempering ducts, sensors, or the like, if necessary.

In an advantageous embodiment, the blow mold preforms are manufactured by fully circumferentially coating a container or container model and subsequently segmenting the coated container or container model. For example, the fully circumferentially coated container can be a sample bottle, a prototype or the like.

Negative models according to the disclosure can in principle be produced from any material, such as plastic, wax, composite materials, foam, glass, or the like negative models made of metal are particularly advantageous. For the coating according to the disclosure, metal layers are generally especially suited, for example, made from a low-melting aluminum-nickel alloy.

In a particularly advantageous embodiment, the blow mold preforms are manufactured by partially circumferentially embedding a container or container model, in particular, in a viscoplastic base and by coating the exposed container portion. In principle, any model body can be embedded in a suitable base instead of containers. Viscoplastic embedding is understood to be non-elastic embedding, for example, by pressing the container or model body into a suited material which plastically deforms permanently. By embedding the model body into viscoplastic carrier material, a blow mold preform can be produced, in particular, in the shape of a half shell.

Thereby, the negative model can describe in particular one half of the geometry to be molded which in particular for rotationally-symmetric containers enables production of a plurality of blow mold sets with only one master mold in the shape of the negative model. Such blow molds sets are used, for example, in stretch-blowing machines with multiple cavities. For non-rotationally-symmetric containers, such as formed bottles, such blow mold sets can commonly be produced with a corresponding pair of negative models, i.e. two master molds.

With the negative models according to the disclosure, blow molds can generally be produced particularly cost-effectively and quickly.

Preferably, the negative model comprises a sample container, such as for example, a plastic bottle originating from a series production, in particular, a plastic bottle filled with a cooling medium and/or being under positive pressure. However, other negative models could also be used, for example, test bodies, prototypes, or the like made of metal, plastic, glass, composite materials, or the like.

With a cooling medium, in particular a coolant, overheating of the negative models and/or shrinkage of the blow mold preforms during flame-spraying can be counteracted. With the aid of overpressure, especially thin-walled plastic containers or the like can be mechanically stabilized during flame-spraying, in particular to counteract shrinkage during flame-spraying.

Furthermore, dissolvable negative molds made of a chemically and/or thermally dissolvable and/or detachable material are preferably temporarily applied to the side of the blow mold preform facing away from the negative model, in particular on the carrier layer, and are by flame-spraying applied a metal and/or ceramic coating. The dissolvable negative molds have in particular such a shape, that by removing the dissolvable negative mold from the surrounding metallic and/or ceramic coating, a functional cavity is formed, such as a duct for passing a heat-conducting medium. The dissolvable negative molds can be removed from the coating surrounding them, for example, using suitable solvents and/or by melting them out. The cavities thus produced can be used for cooling the blow molds, for heating same, for receiving sensors, active heating elements, active cooling elements, electric lines or the like, and/or for channeling compressed air.

The tempering ducts thus produced enable particularly good heat transfer between the passed heat transfer medium and the adjacent blow mold walls without any thermally insulating intermediate layers. Furthermore, tempering ducts can be produced at particularly small distance from the contact layer and/or with a substantially constant distance from the contact layer.

Several dissolvable negatives molds can be applied, for example, in the form of a joint method step, on the blow mold preform. A large number of cavities, such as tempering ducts, connection channels, supply channels or the like, can thus be produced with little technical effort and thereby particularly cost-effectively. In particular, complex channel structures can be produced in the interior of the blow molds. This is particularly advantageous for a production of formed bottles in which the blow molds must preferably be heated to different temperatures at individual sections.

In another preferable embodiment, heat conduction pipes are further applied to the blow mold preform on the side facing away from the negative model, in particular directly on the carrier layer, and are by flame-spraying applied a metallic and/or ceramic coating. Such heat conduction pipes are preferably manufactured of thin-walled pipes and/or tubes to ensure good transfer of heat from the passed heat-conducting medium to the adjacent wall regions of the blow mold. The subsequent metallic and/or ceramic coating by flame-spraying improves heat transfer and serves to avoid air gaps between the wall of the blow mold preform and the heat conduction pipes.

Preferably, at least a temperature sensor, a pressure sensor, a heating element, and/or a cooling element are further applied to the side of the blow mold preform facing away from the negative model, in particular directly on the carrier layer, and are by flame-spraying applied a metallic and/or ceramic coating. This allows for easy integration of sensors and actively operated heating elements and cooling elements for good heat transfer to the adjacent wall portions of the blow mold.

Preferably, an electromagnetically readable data carrier, in particular an RFID chip, is further applied to the side of the blow mold preform facing away from the negative model, in particular directly on the carrier layer. This allows product designation, monitoring and identification of the blow mold. In particular in the context of back-filling the blow mold preforms, such data carriers are protected from aggressive cleaning agents and mechanical stress and integrated into the blow molds in a manner invisible to product pirates.

Preferably, the negative model is elastically deformed for releasing the blow mold preform, and/or the blow mold preform is elastically deformed for detaching from the negative mold. In particular, an elastic negative model facilitates the demolding of blow mold preforms with undercuts or the like. For example, the negative model can be designed as a thin-walled half-shell that can be slightly pressed together for demolding.

Preferably, the negative model is mounted on a base plate with at least one negative mold for fasteners for affixing the blow mold preforms in outer mold shells or the like. The negative model and the at least one negative mold are then jointly coated when manufacturing the blow mold preform. With the at least one negative mold, functional surfaces can be provided, especially in areas in which corresponding blow molds contact each other in the closed state of the blow mold, with which the blow mold preforms can be fixed in a positive-fit manner in support structures, such as in the outer mold shells.

A particularly favorable embodiment of the method according to the disclosure further comprises a step of back-filling the blow mold preforms on their side facing away from the negative model with, in particular, a metal-containing resin, a metal alloy and/or, in particular, metal-containing foam. For example, the blow mold preform can optionally after mechanical finishing be positioned in a molding box or in a base body of an injection mold tool and back-filled with a resin, for example, having an aluminum content of 80 to 90%. Back-filling could also be realized with a low-melting metal alloy. As an alternative, for example, foaming with aluminum-containing foam is conceivable.

Preferably, the blow mold preforms are placed in outer form half-shells and connected thereto by back-filling. Such half-shells can be manufactured, for example, from metal or plastic and respectively have a positive fit with the blow mold preforms. After such fixation of the blow mold preforms, a gap formed between the blow mold preforms and the blow half-shells can be filled in a simple manner. In order to promote heat transfer between mold carriers and blow mold halves, back-filling is preferably performed with a resin or an alloy having good thermally conductive properties. In this manner, particularly effective blow mold tempering can be realized in the blow molds according to the disclosure during the production of plastic containers. A tempering apparatus, such as pipes made of copper, aluminum or the like conveying heat-conducting media, can also be cast into the back-fill. Similarly, sensors for temperature monitoring, pressure control can be integrated into the blow mold or the like into the back-fill.

The thermal conductivity properties of the back-fill are preferably in a range of 1 to 100 W/(m*K), the thermal conductivity properties of the carrier layer are preferably in a range of 1 to 500 W/(m*K), and the thermal conductivity properties of the contact layer are preferably in a range of 1 to 500 W/(m*K).

The thickness of the carrier layer is preferably 1 to 5 mm, in particular 2 to 3 mm. The thickness of the contact layer is preferably 0.1 to 1 mm, in particular 0.1 to 0.5 mm.

BRIEF DESCRIPTION OF THE DRAWINGS

The object posed is also satisfied by a blow mold according to claim 14 and a container according to claim 15.

Preferred embodiments of the disclosure are illustrated in the drawing.

FIG. 1 shows a schematic illustration of a preferred embodiment of the manufacturing method according to the disclosure;

FIG. 2 shows a schematic plan view of a blow mold preform back-filled according to the disclosure;

FIG. 3 shows a schematic layer structure of a blow mold preform according to the disclosure;

FIG. 4 shows a schematic cross-section through a blow mold according to the disclosure.

DETAILED DESCRIPTION OF THE PREFERRED EMBODIMENT

Figure 5:
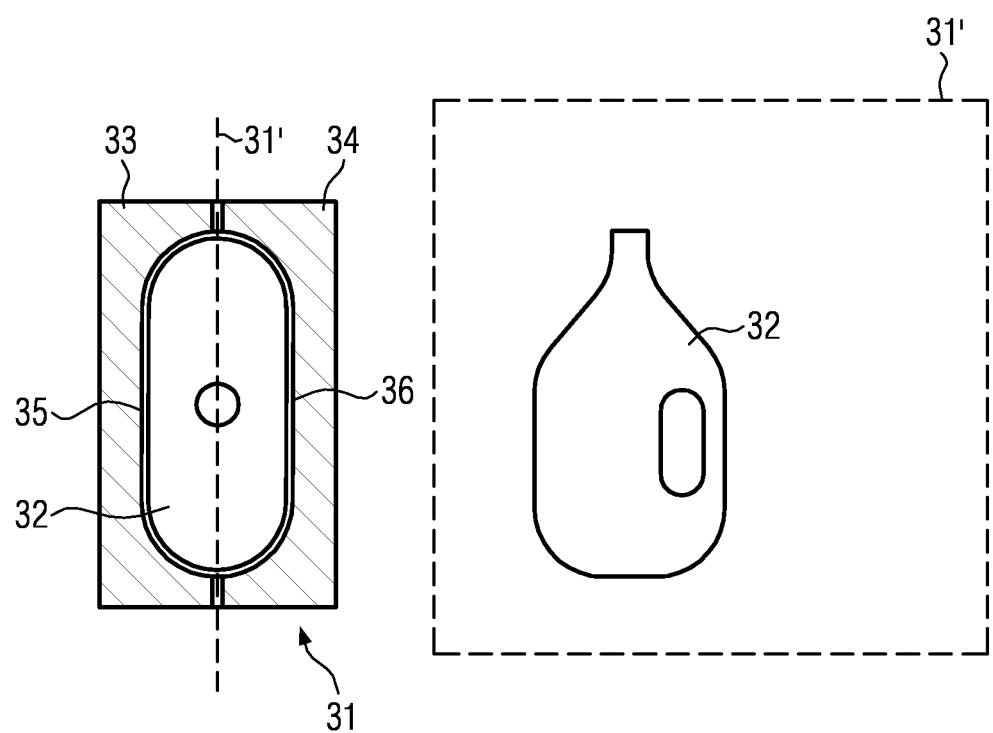
FIG. 5 shows a schematic view of a container manufactured with the blow mold according to the disclosure and the associated blow mold.

As shown in FIG. 1 with reference to FIG. 4, a preferred embodiment of the method according to the disclosure for manufacturing blow molds 1 comprises a step marked with an A, in which a negative model 2 of a blow mold segment 3 to be manufactured is provided, for example, a blow mold half. The negative model 2 is a body substantially corresponding to a negative mold of the inner wall 3a of the blow mold segment 3 to be manufactured and therefore corresponds to the positive mold of the partial cavity 5a of the blow mold 1 enclosed by this blow mold segment 3. Preferably, the blow cavity 5 of the blow mold 1 is composed of two complementary partial cavities 5a, 5b, which are symmetrical with respect to a parting plane 1' of the blow mold 1. The blow cavity can particularly preferably also be composed of three complementary partial cavities, namely two partial cavities 5a, 5b as well as an associated base member (not shown).

As shown, the negative model 2 can be made, for example, of a plastic bottle, half of it being embedded along its major axis in a base 6, which can in particular be made of viscoplastic material. Likewise, the negative model 2 shown in FIG. 1 can be manufactured using any model body made of metal, plastic, foamed material, or the like, such as by CNC milling or the like. The base 6 shown in FIG. 1 could then also be a rigid base plate.

If the negative model is a hollow body 2, in particular a thin-walled plastic bottle, then the negative model 2 can be filled with a coolant or a gas under positive pressure. This allows thermally induced shrinkage and/or plastic mechanical deformation, in particular during the subsequent flame-spraying, to be reduced and/or avoided.

In a step marked B, a blow mold preform 9 is sprayed onto the negative model 2 by flame-spraying using a coating method 7 known per se. The blow mold preform 9 is preferably structured having multiple layers, and can on its side 9a facing away from the negative model 2 comprise elevated functional structures which enclose, in particular, cavities formed in the blow mold preform 9, such as channel walls or the like. Their production by flame-spraying shall be explained in more detail with reference to the FIG. 3.

Subsequent to flame-spraying, the blow mold preform 9 is separated from the negative model 2. The demolding is schematically symbolized by parting arrows 10. In order to facilitate demolding in the region of the undercuts or the like, in particular, the negative model 2 can be formed elastically. Depending on the layer structure and material thickness of the blow mold preform 9, it would basically also be conceivable to design it with an elasticity required for demolding. The blow mold preform 9, however, is preferably at least so rigid that it can without any deformation be attached in the blow mold 1.

In an optional step designated with C, the blow mold preform 9 is mechanically stabilized by a back-fill 11 and/or prepared for mounting in the blow mold 1. For this purpose, a suitable outer mold 12 is provided so that a gap formed between the blow molding preform 9 and the outer mold 12 is filled with the back-fill 11. The back-fill 11 is composed of material having thermal conductivity and strength suited for a subsequent production operation. Metal-containing foams and/or metal-containing resins or the like are suited.

The negative model 2 is basically designed as a permanent mold. For example, a plurality of corresponding blow molds halves for blowing rotationally-symmetric containers can be produced with a single negative model 2. To produce non-rotationally-symmetrical containers, such as the formed bottle 32 indicated in FIG. 5, a pair of negative models (not shown) corresponding to each other in mirror image with respect to the parting plane 31' of the associated blow mold 31 is then required.

Using a single negative model 2, or a corresponding pair of negative models, a respective series of blow mold halves can be produced, in order to equip, for example, the blow cavities of a blow molding machine with identical blow molds 1. Blow molds 1 with relatively low dimensional tolerances can therefore be manufactured inexpensively in series.

FIG. 3 is a schematic representation of a preferred layer structure of the blow mold preform 9 according to the disclosure. According thereto, it comprises a contact layer 13 that is in a first coating step applied to the negative model 2, for example, likewise by flame-spraying. Furthermore, a carrier layer 14 is provided, which is subsequently applied to the contact layer 13 using flame-spraying. The carrier layer 14 has a primarily mechanically supporting and heat-conducting function.

The contact layer 13 is during the later blowing in contact with them, just like with process media, cleaning agents or the like. Accordingly, the contact layer 13 is specially adapted to the later production conditions within the blow mold 1.

Preferably, the contact layer 13 is thinner than the carrier layer 14. Relatively costly materials used for the contact layers 13 can thereby be saved. Preferred properties of the contact layer 13 are, for example, a thermal conductivity specifically adapted to the respective blowing process and/or lower electrical conductivity and/or higher mechanical resistance to wear and/or higher toughness and/or tensile strength and/or improved corrosion resistance and/or resistance to microbes than the carrier layer 14.

As is evident from FIG. 3, an elevated functional structure 15, such as in the form of a wall of a cavity, for example, a cooling duct, a heating duct or the like, is preferably provided on the side of the blow mold preform 9 facing away from the negative model 2. Such functional structures 15 can be produced in a particularly simple manner in that, after flame-spraying the carrier layer 14, at least one dissolvable negative mold 16 is initially temporarily applied, for example, by being sprayed onto the carrier layer 14.

The dissolvable negative mold 16 is also an elevated structure, for example, in the shape of a raised web, or the like. The dissolvable negative mold 16 is composed of a material which can specifically again be dissolved and/or detached using solvents and/or by heating the carrier layer 14. Various materials, possibly even water-dissolvable ones, such as a thickened sugar solution caramelizing at about 160° C., can be used for the dissolvable negative mold 16.

Prior to removing the dissolvable negative mold 16, it is also coated by flame-spraying with a preferably metal-containing and/or ceramic-containing layer, which then forms the frame of the functional structure 15, in particular a wall of a cooling duct, a heating duct, a cable duct or similar cavities. The carrier layer 14 and the functional structure 15 are preferably made of the same material.

Dissolvable negative molds 16 can, for example, be entirely automatically sprayed on. They allow for the formation of negative models for cavities directly on the carrier layer 14. After dissolving the negative mold 16, the hollow of the cavity thus created essentially corresponds to the shape of the dissolved negative mold 16. Consequently, cavities, in particular ducts having a very small distance to the inner surface of the blow mold 1 can be produced. Such ducts, as opposed to separate pipes or tubes running along the surface 9a facing away, can likewise be adapted almost arbitrarily to the contour of the carrier layer 14 and follow it in direct contact. In particular heat-insulating air pockets between the walls of the tempering ducts and the carrier layer 14 can there be reliably avoided.

Tempering ducts, with good heat transfer properties for cooling or heating the blow mold halves, can be specifically produced in this manner in almost any pattern of distribution and in a cost-effective manner.

Instead of or in addition to the dissolvable negative mold 16, separate pipes or tubes can also be attached permanently on the carrier layer 14, which are then also enclosed with a coating by flame-spraying. Also in this case, the coating of such pipes or tubes can be made of the same material as the carrier layer 14.

After demolding, the blow mold preforms 9 can be back-filled with the functional structures 15 in the same manner as indicated in the example in FIG. 1. Heat conduction can be improved by suitable material for the back-fill, for example, metal-containing foams, metal-containing resins or the like.

In FIG. 4, a blow mold 1 with blow mold preforms 9 according to the disclosure is schematically illustrated in cross-section. It comprises two blow mold halves 3, 4 arranged in mirror-image with respect to the parting plane 1' of the blow mold 1. Furthermore, two associated outer mold shells 19, 20 of the blow mold halves 3, 4 are indicated. Gaps formed respectively between the blow mold preforms 9 and the outer mold shells 19, 20 are filled with a back-fill 21.

Indicated schematically are also connecting structures 9b, which are produced during flame-spraying of the blow mold preforms 9 as an integral part of the blow mold preforms 9. The connecting structures 9b are used for positive-fit positioning of the blow mold preforms 9 in the outer mold shells 19, 20 by engagement in corresponding connection structures 19a, 20a, for example, grooves or the like. Assembly of the blow mold halves can be performed such that the blow mold preforms 9 are initially in a positive-fit manner hung into the outer mold shells 19, 20 and are then by back-filling 21 connected to the outer mold shells 19, 20 substantially without a gap. Finally, the blow mold halves, for example, using master molds, can be installed in a known manner in hinged-on blow mold carriers (not shown).

Production of the connection structures 9b of the blow mold preforms 9 can be effected such that, for example, corresponding negative molds 6a of the connecting structures 9b are formed in the base 6 indicated in FIG. 1 or in a similar base plate. These negative molds 6a are coated together with the negative model 2 by flame-spraying in order to establish the connecting structures 9b as an integral part of the blow mold preforms 9. The connecting structures 9b of the blow mold preforms 9 and the corresponding negative molds 6a are indicated only schematically in FIGS. 1 and 2.

A container 32, manufactured using the blow mold 31 according to the disclosure, is shown in FIG. 5 by way of example for a formed bottle. According to the plan view shown in FIG. 5 at the left, a pair of blow mold halves 33, 34 is provided which correspond in mirror-image with respect to the parting plane 31' of the blow mold 31. They can be manufactured according to the method steps described from negative models corresponding to each other in mirror image. The surface properties of the container 32 can be adapted, for example, in a simple manner with the contact layer 13 of the associated blow mold preforms 35, 36.

The blow mold preforms 9, 35, 36, sprayed onto the negative models according to the disclosure, can be mechanically post-processed in the blow mold halves prior to assembly as required, for example, in terms of deburring, smoothing of edges or the like.

The materials used for the blow mold preforms 9, 35, 36, in particular the contact layer 13 and the carrier layer 14, can be easily adapted to specific production conditions and product requirements in terms of the containers. This is possible in particular due to easy adjustment of the flame-spraying method without fundamental changes to the manufacturing parameters, tools, or the like. Therefore, the method according to the disclosure enables such production of the blow mold halves which is both cost-effective and with low manufacturing tolerances as well as a flexible adaptation to changing production conditions and product requirements.

Due to the large selection of available materials for flame-spraying, the blow mold halves can be flexibly adapted to most different requirements without changing the basic sequence of the method. Different back-fills 11, 21 can also be adapted with little effort to the respective thermal requirements when blowing the container. For this purpose, for example, only the components of the metal-containing additives or the like are to be adapted. Similarly, cooling ducts or channels for segmented temperature control of the blow mold halves can easily and in a flexible manner be integrated into the interior of the blow mold halves. The method of the disclosure also allows in particular that such channels are manufactured with the least possible distance from the surfaces that are active during blowing and at a constant distance to these surfaces.

In analogy to the dissolvable negative molds 16, functional elements 37 can also be permanently integrated into the blow mold preforms 9, 35, 36. This, for example, can be sensors for temperature measurement, pressure measurement, cooling elements, heating elements and/or data carriers that can be read out contactlessly, such as RFID chips. These elements 37 or cavities enclosing the elements 37, respectively, can be coated or formed by the flame-spraying method according to the disclosure and integrated into the blow mold preforms 9, 35, 36 on their side facing away from the respective negative model. In this, positioning of such elements 37 at the blow mold preforms 9, 35, 36 is flexibly adaptable to the respective measuring tasks or control tasks. By integrating these functional elements 37 in the interior of blow mold preforms 9, 35, 36 and thereby in the interior of the blow mold halves 3, 4, 33, 34, these elements 37 can in a simple manner protect against mechanical damage, the influence of process media, cleaning agents, or the like. In this manner, particularly reliable operation of the blow molds 1, 31 manufactured according to the disclosure can also be guaranteed.

The invention claimed is:

1. A method for manufacturing blow molds for plastic containers, comprising:
   manufacturing at least two blow mold preforms enclosing complementary partial cavities of the blow molds, by flame-spraying at least one layer containing one or more of a group of metal, ceramic, and plastic on a negative model of at least one segment of the blow mold to be manufactured, and detaching the at least one layer from the negative model; and
   forming complementary blow mold segments by placing the blow mold preforms in outer mold shells and connecting thereto by at least one of: a positive fit, and a back-filling with a back-fill material comprising at least one or more of a metal-containing resin, a metal alloy, and a metal-containing foam.

2. The method according to claim 1, and coating the negative model first with a contact layer of the blow mold preform and subsequently with a carrier layer of the blow mold preform and wherein the contact layer comprises a thermal conductivity specifically adapted to at least one or more of a predetermined blowing process, a lower electrical conductivity, a higher mechanical resistance to wear, a higher toughness, a higher tensile strength, an improved corrosion resistance, and an improved resistance to microbes relative to the carrier layer.

3. The method according to claim 1, and manufacturing the blow mold preforms by fully circumferentially coating a container or container model and subsequently segmenting the coated container or container model.

4. The method according to claim 1, and manufacturing the blow mold preforms by partially circumferentially embedding a container or container model and by coating the exposed container portion.

5. The method according to claim 1, wherein the negative model comprises a sample container which is at least one or more of filled with a cooling medium and under positive pressure.

6. The method according to claim 1, wherein at least a dissolvable negative mold made of at least one or more of a chemically and thermally detachable material is temporarily applied to a side of the blow mold preform facing away from the negative model and at least one or more of a metallic and ceramic coating is applied by flame-spraying.

7. The method according to claim 6, and wherein heat conduction tubes are permanently applied to the side of the blow mold preform facing away from the negative model and at least one or more of a metallic and ceramic coating is applied by flame-spraying.

8. The method according to claim 6, wherein at least a functional element in the form of one of a temperature sensor, a pressure sensor, a heating element, a cooling element, and a combination thereof is further applied to the side of the blow mold preform facing away from the negative model and at least one or more of a metallic and ceramic coating is applied by flame-spraying.

9. The method according to claim 6, wherein an electromagnetically readable data carrier is further applied to the side of the blow mold preform facing away from the negative model.

10. The method according to claim 1, wherein at least one or more of the negative model is elastically deformed for detaching the blow mold preform and the blow mold preform is elastically deformed for detaching from the negative model.

11. The method according to claim 1, wherein the negative model is mounted on a base with at least one negative mold for fasteners for affixing the blow mold preform in an outer mold shell, and wherein the negative model and the negative mold are jointly coated by flame-spraying when manufacturing the blow mold preform.

12. The method according to claim 6, and back-filling the blow mold preforms on the side facing away from the negative model with a back-fill material.

13. The method according to claim 1, wherein the plastic container are plastic bottles.

14. The method according to claim 4, wherein the container or container model are partially circumferentially embedded in a viscoplastic base.

15. The method according to claim 5, wherein the sample container is a plastic bottle.

* * * * *